(12) United States Patent
Parent et al.

(10) Patent No.: US 8,886,622 B1
(45) Date of Patent: Nov. 11, 2014

(54) INTERACTIVE VISUALIZATION OF MULTIPLE DATA SOURCES ACROSS MULTIPLE COMPUTERS

(71) Applicants: Kevin Todd Parent, Santa Barbara, CA (US); Mattie Ruth Kramer, Los Angeles, CA (US); Alan Lewis Browning, Los Angeles, CA (US); Ryan Patrick Clancey, Monrovia, CA (US); Corey A. Porter, Monrovia, CA (US)

(72) Inventors: Kevin Todd Parent, Santa Barbara, CA (US); Mattie Ruth Kramer, Los Angeles, CA (US); Alan Lewis Browning, Los Angeles, CA (US); Ryan Patrick Clancey, Monrovia, CA (US); Corey A. Porter, Monrovia, CA (US)

(73) Assignee: Conduce Inc., Carpinteria, CA (US)

( * ) Notice: Subject to any disclaimer, the term of this patent is extended or adjusted under 35 U.S.C. 154(b) by 0 days.

(21) Appl. No.: 14/295,188

(22) Filed: Jun. 3, 2014

(51) Int. Cl.
  *G06F 17/30* (2006.01)
  *H04L 12/24* (2006.01)
  *G06F 3/0481* (2013.01)

(52) U.S. Cl.
  CPC .............. *H04L 41/22* (2013.01); *G06F 3/0481* (2013.01)
  USPC .......................................... 707/705; 345/661

(58) Field of Classification Search
  None
  See application file for complete search history.

(56) References Cited

U.S. PATENT DOCUMENTS

| | | | |
|---|---|---|---|
| 8,407,725 B2 | 3/2013 | Kramer et al. | |
| 2005/0192970 A1* | 9/2005 | Chou et al. ................... | 707/10 |
| 2011/0225330 A1* | 9/2011 | Lavian et al. ................. | 710/63 |
| 2011/0295875 A1* | 12/2011 | El Daher et al. .............. | 707/769 |
| 2012/0075337 A1* | 3/2012 | Rasmussen et al. .......... | 345/629 |
| 2014/0007211 A1* | 1/2014 | Yang et al. ................... | 726/7 |
| 2014/0111838 A1* | 4/2014 | Han et al. ..................... | 359/13 |

FOREIGN PATENT DOCUMENTS

WO  WO-2014058909 A2  4/2014

OTHER PUBLICATIONS

Apple Inc., "iPhone User Guide", Copyright 2011, pp. 1-273.*

* cited by examiner

*Primary Examiner* — Hung Q Pham
(74) *Attorney, Agent, or Firm* — Mintz Levin Cohn Ferris Glovsky and Popeo, P.C.

(57) ABSTRACT

A data pool receives first data derived from user-generated input that identifies events that have occurred at the corresponding remote first computing system. Thereafter, the data pool generates messages based on the identified events that specify data to be extracted from each of a plurality of data sources. The data pool then transmits data comprising the generated messages to at least one of a plurality of data daemons. The data pool subsequently receives second data extracted and processed by the data daemons in response to the transmitted data. In addition, the data pool transmits at least a portion of the received second data to at least one remote second computing system to enable the remote second computing system to render visualizations that are based on the received data and which are displayed within at least one data lens that overlays a substrate in the graphical user interface.

20 Claims, 10 Drawing Sheets

INTERACTIVE VISUALIZATION OF MULTIPLE DATA SOURCES ACROSS MULTIPLE COMPUTERS

TECHNICAL FIELD

The subject matter described herein relates to visualizations of data across multiple computers and derived from multiple data sources.

BACKGROUND

The explosion of data in volume, variety, and velocity (colloquially known as Big Data) across enterprises of all types, from government entities to commercial businesses, has forced leaders to reevaluate the tools and methods used for informed decision making. Visualization plays a key role in connecting decision makers to their data. Visualization is particularly important when there are many data sources, each with large amounts of data.

No longer is it reasonable to make critical decisions based on partial information from a single silo of data; nor is it feasible to cycle through myriad separate sources and tools to arrive at unified result. Separate systems designed for strategic analysis, steady-state operations management and crisis management further complicates the information management challenge and therefore the decision-making environment. A new approach is required in which data from many silos can be explored concurrently, in an ad-hoc way to support the enterprise as it deals with competition, complexity and uncertainty. Industry is frustrated by the typical monolithic approach; it calls for a polymorphic approach—a flexible environment in which new data sources and analytic techniques can be brought to bear, as needed, in real time. Further, proprietary data are compared to trends in exogenous or open data sources in a non-invasive way and without risk of cross contamination.

SUMMARY

In one aspect, a data pool receives first data derived from user-generated input on at least one remote first computing system that identifies events that have occurred at the corresponding remote first computing system. Thereafter, the data pool generates messages based on the identified events that specify data to be extracted from each of a plurality of data sources. The data pool then transmits data comprising the generated messages to at least one of a plurality of data daemons. Each data daemon is connected to a different data source among a plurality of data sources. The data pool subsequently receives second data extracted and processed by the data daemons in response to the transmitted data. In addition, the data pool transmits at least a portion of the received second data to at least one remote second computing system to enable the remote second computing system to render, in a graphical user interface, visualizations that are based on the received data and which are displayed within at least one data lens that overlays a substrate in the graphical user interface.

The first data can be generated by at least one coordination pool in communication with at least one input device. The at least one input device can be used to control at least one of: instantiation, deletion, relative position, or size of one or more data lenses. The at least one input device can be used to control at least one of: instantiation, deletion, relative position, or size of the substrate. The at least one input device can be used to specify display elements to be included within one more data lenses.

The second data can include visualizations generated by the data daemons. At least one data lens can be partially transparent so that features on the substrate can be viewed. In some variations, there can be two or more data lens that each partially overlap with another data lens. There can be two or more remote computing systems that provide a unified and non-duplicative visualization.

At least one code can be displayed on or adjacent to the substrate that is used by the at least one remote first computing system to connect with the at least one second computing system via the data pool. The at least one remote first computing system can be the same as the at least one remote second computing system. The at least one remote first computing system can at least partially differ from the at least one remote second computing system.

The second data can comprises tags identifying a corresponding data lens in which a visualization is to be displayed.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter allows for the quick and intuitive creation of interactive visualizations from multiple data sources that allows for multiple iterations across various types and techniques for visualization. Iteration leads to better, faster decision making with regard to the data being visualized.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
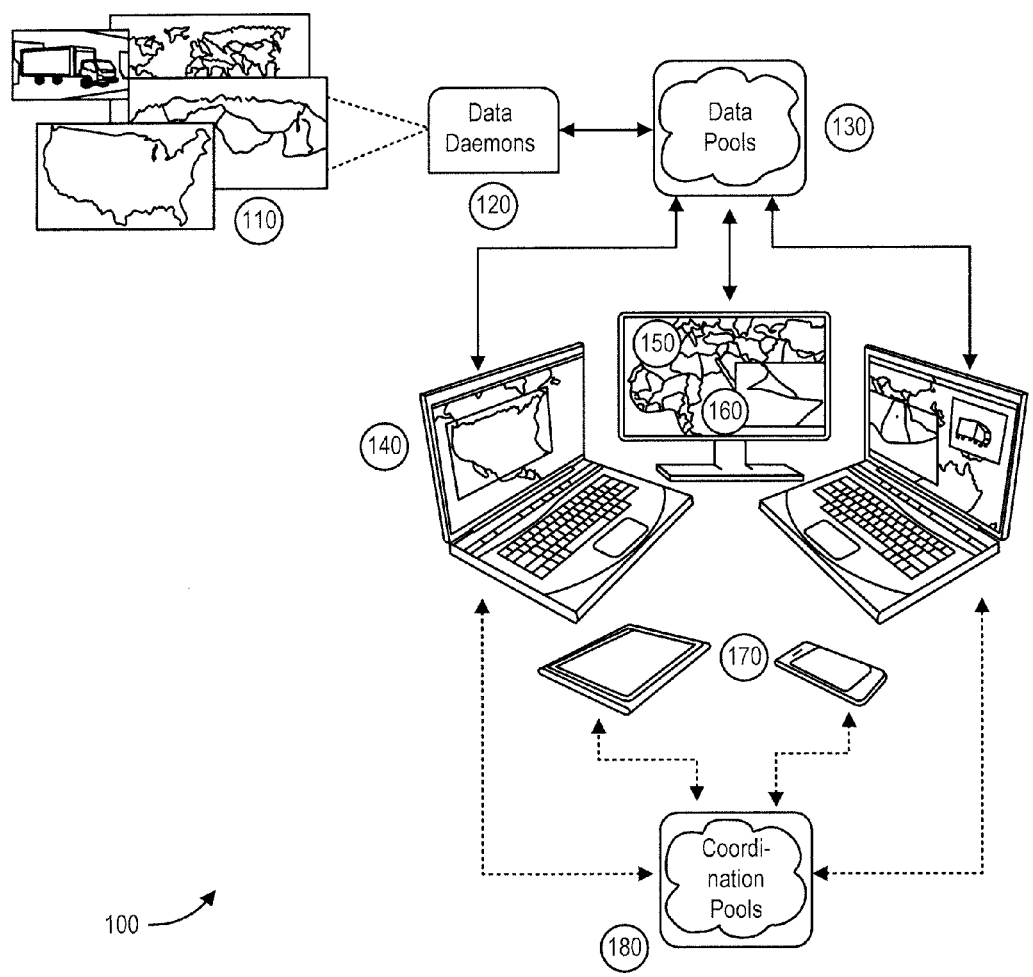
FIG. 1 is a diagram illustrating a system for interactive visualization of multiple data sources across multiple computers.

With reference to diagram 100 of FIG. 1, a system is provided in which data in multiple forms such as databases, spreadsheets, raw data, video files, images, application data, visualizations, or similar can be stored in multiples data sources 110. The storage for these sources can include, for example, one or more of local storage, memory, network connected hard drives, cloud computing, web services, and the like.

In addition, the system can include data daemons 120, one per data source, form a connection to each data source 110. Data daemons 120 in this regard can be applications written in any software language that run on a connected computer. Each data daemon 120 can be programmed to run in the background, awaiting an external event at which point an action (or series of actions) can be triggered. Extraction of data from the data source 110 by a data daemon 120 can be performed through an interface to the data source 120 (e.g., a pre-defined and standard provided by that data source). Example interfaces to the data sources 120 can include Application Programming Interfaces (APIs), database queries, emitting text characters and reading returned text (screen scraping), etc.

The data daemons 120 can await message from one or more data pools 130. Data pools 130 in this regard can be files on local or networked hard drives together with associated programs that manage the depositing of messages into such files and the reporting and transmission of the messages to other programs. Upon receipt of a particular message from a data pool 130, the corresponding data daemon 120 can extract some data from its associated data source 120 based on instructions in the message. The instructions can indicate a subset of data to extract based on the actions of the users (as will be described in further detail below). The data daemon 120 can the process the extracted data for visualization, and deposits the resulting visualization in the data pools. Processing, in this regard, can include various forms of analytics, parsing, selecting, and encapsulating. For example, the data daemon 120 can determine that there are more elements in the selected region than can be rendered effectively. The data daemon 120 can then generate summary visualization elements (e.g., icons, etc.) to represent this fact. The data daemon 120 can be best suited for the rendering because it is programmed for the particular data source. Such a distributed rendering approach is also advantageous in that it enables taking advantage of distributed computing resources and robustness/redundancy (if one data daemon 120 fails, the system continues to operate without that data source 110). Finally, by processing and rendering each data source 110 separately, the various data sources are kept separate which is helpful in applications in which data security is important. Visualizations can include rendered diagrams, shapes, heat maps, videos, images, etc.

One or more display computers 140 (also sometimes referred to herein as computing systems) can be connected/ coupled to the data pools 130. These display computers 130 can include laptop computers, desktop computers, rack-mounted computers, microcomputers, mobile phones, tablet computers, etc. Based on user actions via a graphical user interface on each display computer 140, the display computers 140 can send messages to the data pools 130, which, in turn, send those messages to the data daemons 120. The messages sent from the display computer 140 can be based on user actions. When the user instantiates, moves, or resizes a data lens 130, for example, the message can include the location of the data lens 130 with respect to a substrate 150 (latitude and longitude of the corners of the data lens in the case of a map substrate). Other information may include settings or parameters that the user may have chosen for a particular data lens 130. An example might be whether or not to display transformers in an electric grid data lens 130.

Figure 2:
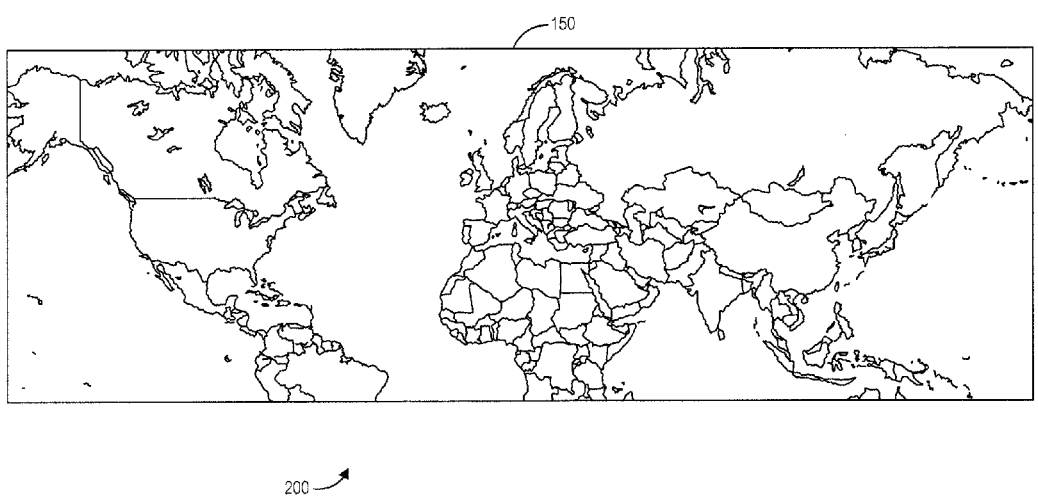
FIG. 2 is a diagram illustrating a map substrate.
Figure 3:
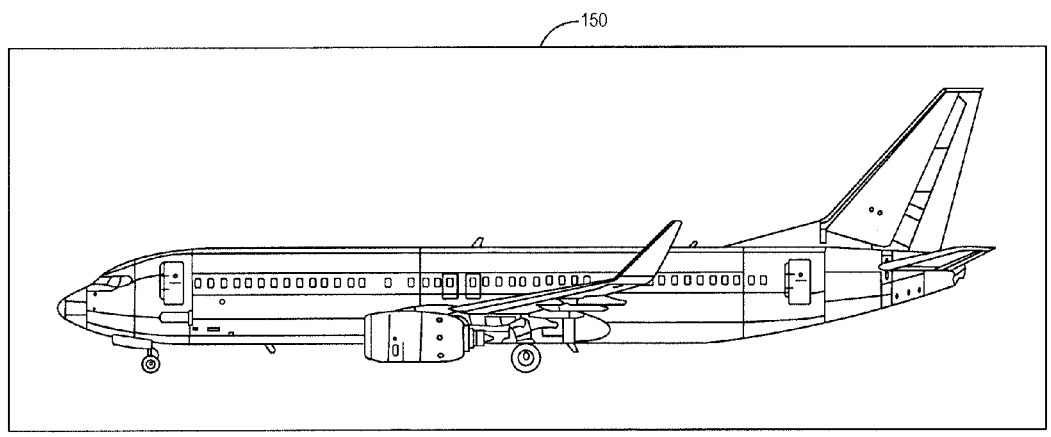
FIG. 3 is a diagram illustrating an airplane substrate.

The display computers 140 can display a substrate 150, a map in this example, as a background for the visualizations generated by the data daemons 120. Other graphical backgrounds can be used as substrates 150 such as a rendering of a three dimensional object, a plot along two or more axes, an image, etc. FIG. 2 is a diagram 200 illustrating a sample substrate 150 that illustrates a map. In some cases, the substrate 150 can be segmented and displayed across multiple display computers 140. FIG. 3 is a diagram 300 illustrating a variation of a substrate 150 that includes a side schematic view of an airplane.

Figure 4:
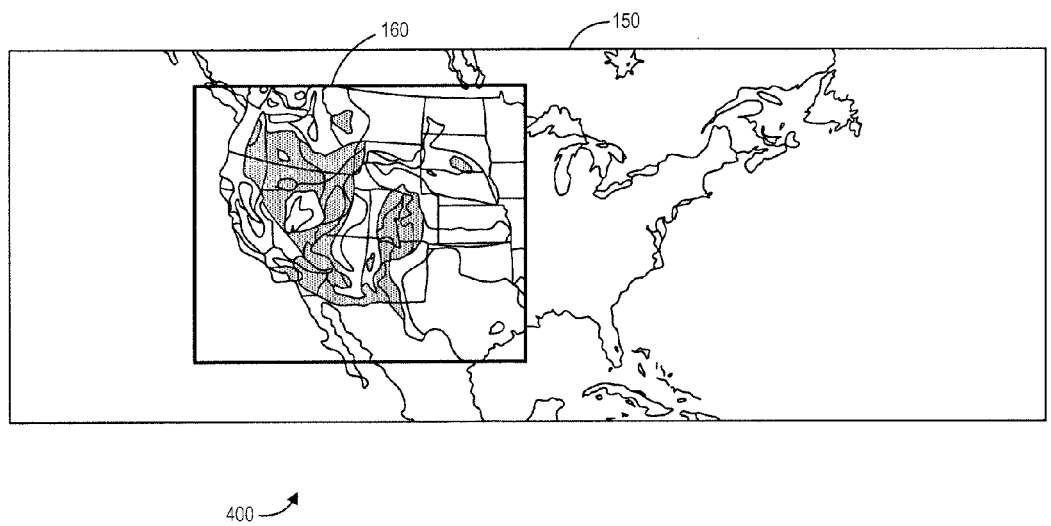
FIG. 4 is a diagram illustrating a heat map data lens overlaying a portion of a map substrate.
Figure 5:
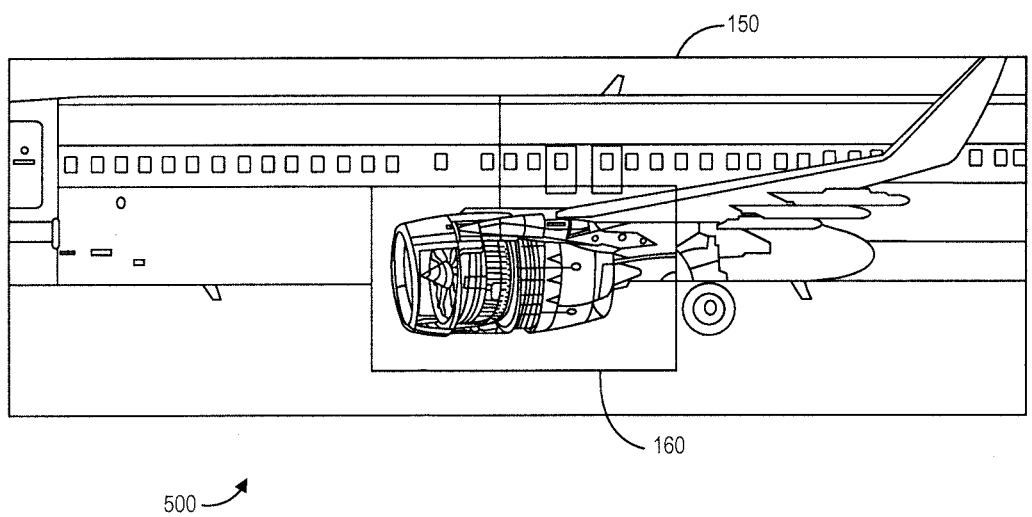
FIG. 5 is a diagram illustrating a cutaway data lens overlaying a portion of an airplane substrate.

The display computers 140 can receive visualizations back from the data daemons 120 by way of the data pools 130 and then display the visualization atop the substrate 150 in data lenses 160. A data lens 160 can be characterized as a region of the screen, rectangular or another shape, with or without a border, which contains imagery from a data source. Data lenses 160 can be partially transparent to reveal some of the substrate 150. FIG. 4 is a diagram 400 that illustrates a data lens 160 that overlays a map substrate 150 in which attributes of interest within the boundary of the data lens 160 are illustrated as a heat map. FIG. 5 is a diagram 500 that illustrates a data lens 160 over an airplane substrate 150 that shows a cutaway detail of a portion of an airplane (i.e., the engine) that the data lens overlays. It will be appreciated that the visualizations displayed within each data lens 160 can be continually updated and/or periodically updated depending on the desired refresh rate and the like. For example, live video feeds can be conveyed in a data lens 160.

Figure 6:
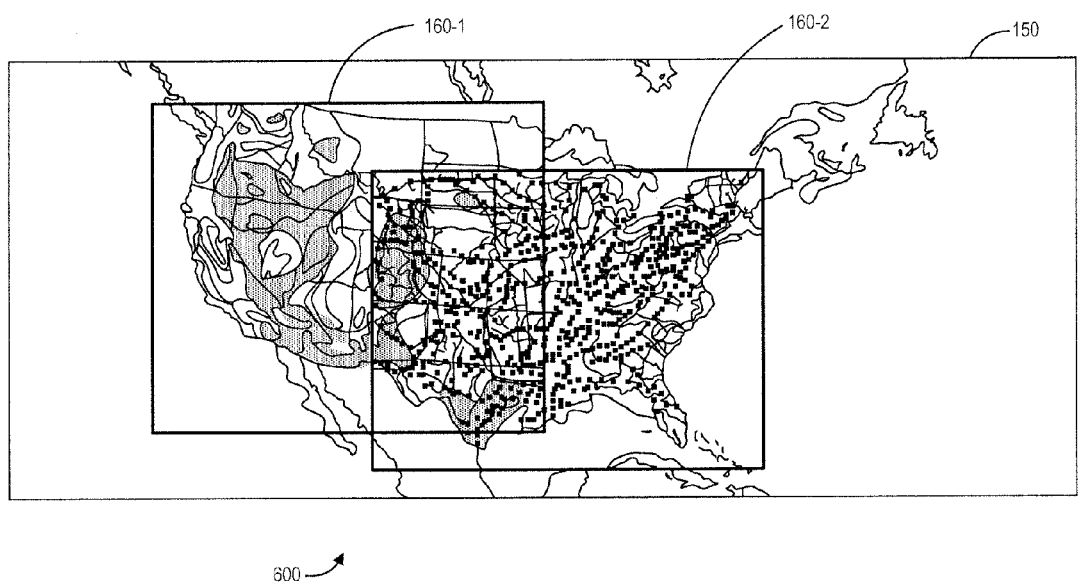
FIG. 6 is a diagram illustrating both a heat map data lens and a network data lens overlaying a map substrate.
Figure 7:
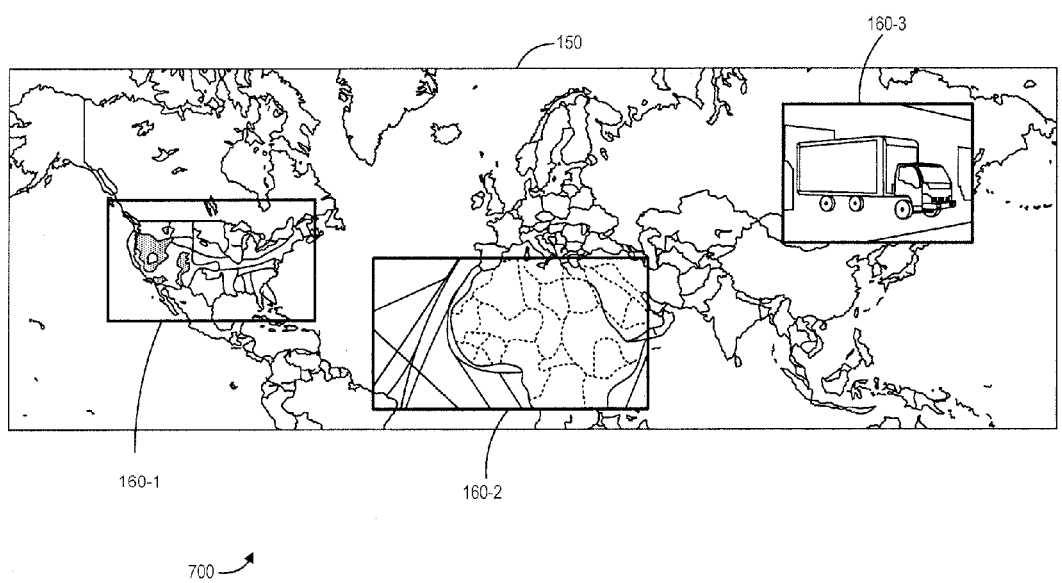
FIG. 7 is a diagram illustrating a heat map data lens, a network data lens, and a video data lens overlaying a map substrate.

In addition, two or more data lenses 160 can overlap so that visualizations provided in each lens can be concurrently displayed/conveyed to a user. Diagram 600 of FIG. 6 illustrates such an arrangement in which there is a heat map data lens 160-1 that partially overlaps a network data lens 160-2 (in this case showing gas pipelines) both of which overlay a map substrate 150. FIG. 7 is a diagram 700 illustrating an alternative in which there are three lenses overlaying a map substrate 150 and none of the lenses overlap. The first data lens 160-1 overlays the United States and is a heat map. The second data lens 160-2 is a network data lens that shows shipping lines within Africa. The third data lens 160-3 is a video data lens 160-3 which shows a live video feed from a facility in Asia.

In some variations, the location of data lens 160 can be movable within the graphical user interface based on user-generated input activating associated graphical user interface elements. The display computers 140 can cause the visual data in the data lenses 160 to stay aligned with the substrate 150 even when the user changes the viewpoint or moves the data lens 160. If there are multiple display computers 140, in some variations, two or more of such display computers 140 can be configured to display a unified view of the substrate 150 and the data lenses 160, which may span any or all of the displays showing the unified view.

Users can use one or more interface devices 170 such as smart phones, laptops, or tablets to interact with the system. Users manipulate input devices such as computer mice and keyboards or inertial, spatial, touch screens, or other sensors in the interface devices to control the visualization on the screens of the display computers 140. Through these interface devices 170, users can control the perspective on the substrate (position and height above the ground, for example). The users can also control the instantiation, deletion, position, and size of the data lenses 160 through these interface devices. The display computers 150 and the interface devices 170 can communicate with each other to coordinate their actions by way of messages passed back and forth by way of coordination pools 180, which are the same as data pools but transfer only coordination messages.

For example, a user holds a smartphone that is running a "pointing" program. The phone is connected via a WiFi, Bluetooth, or similar connection to a network. Also attached to that network is a computer that is running another program for managing a coordination pool. When the user moves the phone, sensors within the phone detect that motion, and the motion data (how far the phone has moved and its orientation, for example) is provided to the program. The program sends a message over the network to the coordination pool. This message is now available to any other connected device, including any display computer. The display computer may then update its display based on the user action.

It will be appreciated that the data pools architecture allows for the synchronization of multiple systems in real time. By pointing multiple local or remote display computers 140 and interface devices 170 at a common coordination pool 180, the systems will all respond to user actions at either location, thus allowing for remote collaboration.

User Actions and Interface Devices

First, a user (who may or may not be in front of a display computer 140) decides he or she wishes to cause some action within the visualization environment. The user can then launch an application onto an input device 170 such as a smart phone, tablet, laptop or similar device. The application can be local to the input device 170 or it can be a web application, which is loaded through the web browser of the input device 170. Using this application, the input device 170 can connect with the display computers 140. This connection can be accomplished in a variety of ways including by typing in an address/unique code or by using a camera on the input device 170 to view/capture a code, such as a bar code or QR Code (Quick Response Code) (see code 710 in FIG. 7), displayed on the screen of one of the display computers 140. The displayed code can, for example, point the device to the appropriate IP address and coordination pool 180 to make the connection with the display computers 160 via the coordination pool 180.

Figure 8:
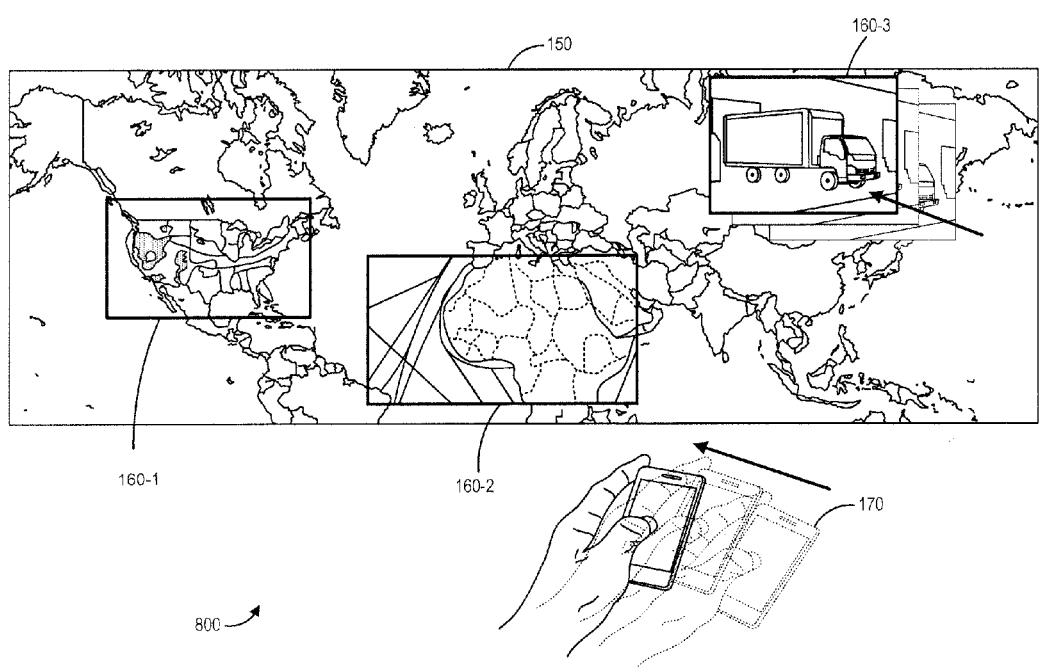
FIG. 8 is a diagram illustrating movement of a data lens in relation to a substrate using an input device.

Once connected, the application on the input device 170 can be used to control what is being visualized on the display computer(s) 140. The user can activate various graphical user interface elements (e.g., buttons, etc.) directly on the screen of the input device 170 or the user can move or rotate the input device 170 in cases in which the input device 170 has an inertial sensor or other sensors (e.g., proximity sensors, accelerometers, etc.). These actions can be translated by the application executing on the input devices 170 into messages that can, in turn, be deposited into a coordination pool 180. For example, with reference to diagram 800 of FIG. 8, the user can point his or her input device 170 towards a video feed data lens 160-3 and activate a graphical user interface element associated with such data lens (for example, by selecting a button on a touch screen interface on the input device 170). By moving the input device 170, the data lens 160-3 moves in a corresponding fashion until the same or a different graphical user interface element is activated.

Display Computers

Processes within the display computers 140 can listen to the coordination pool 180, and are alerted when a user action message (i.e., a message originating in response to user manipulation of an input device 170) is deposited therein. The program running in the display computers 140 can then interpret the message and takes the appropriate action. For example, if the message is to move the cursor, because the user took that action by pointing at the screen and then moving the input device 170, the display computer 140 can update the cursor position. If the user selected a button to change a parameter in one of the data lenses 160, the display computer(s) 140 can update the appropriate data lens 160.

In some variations, multiple user actions on multiple input devices 170 can occur simultaneously. Each action can be used to generate a message that is processed in parallel. If there are multiple display computers 140, actions can be coordinated via the coordination pool 180. In some cases, the relative physical position of the screens can be established during an initial calibration procedure. In one calibration procedure, one screen can be established as the main display, and the others can be established as secondary displays. User actions on an input device 170 may or may not have an effect on a particular display computer. Based on the stored calibration in conjunction with the current user action, each display computer 140 can coordinate with the other display computers (particularly with the main computer in the case of secondary computers). Through this coordination, each determines whether the intended user action has an impact on its own display computer 140 (or not) and acts accordingly.

One type of user message is a navigation action. In a navigation action, the user can express the intent to shift the overall view either laterally, vertically, or into/out of the plane of the screen (or any combination of these three dimensions). Upon receiving this message, the main display computer 140 can adjust its perspective or viewpoint and all the display computers 140 follow to adjust their viewpoint accordingly.

Data Lenses and Data Daemons

When the user action impacts one or more of the data lenses 160, the main display computer 140 can create a data message. This data message is deposited in the data pool(s) 130. Each of the existing data daemons 120 can listen to the data pool(s) 130. Each data lens 160 can be connected to a particular data daemon 120 and the message can include a tag that identifies the corresponding data lens 160. Upon identifying a message associated with its corresponding data lens 160, the data daemon 120 can interpret the message and takes the appropriate action. If the action being requested involves obtaining new data from its associate data source 110, the data daemon 120 can form the correct query to extract the appropriate data. An individual data daemon 120 can be designed and built explicitly to retrieve data from a particular data source 110. When the new data is returned, the data daemon 120 can take action on that data depending on its programmed function. In particular, the data daemon 120 can take the data and visualize it (i.e., render a visual representation of the data, etc.). Other data daemons 120 can perform analysis on the data before visualizing (e.g., changing the way that elements appear based on their values; such changes can include color, animation, alternate icons, etc.). Yet other data daemons 120 can route the data to some other analysis process. At the end of its processing, the data daemon 120 can deposit its results (visualization pixels or other data) as a reply message into the data pool(s) 120. Results can be visual "textures" that are displayed directly in a data lens. In some cases the results from the data daemon 120 can be a representation of a topology, such as of a network with nodes and edges (connections between nodes). The display computers may in this instance perform the final rendering of the network on the screen. The reply message can be tagged as a response to the associated data message from the display computers 140.

The display computers 140 can listen to the data pool(s). When they receive a reply to a data message from the data daemon 120, the display computers 140 can interpret that message and update the corresponding data lens or lenses 160 accordingly. If the message contains pixels, the display computers 140 can display all or a portion of those pixels in the correct location within the corresponding data lens 160. When the display updates, the loop can be closed back to the user who initiated the action.

Figure 9:
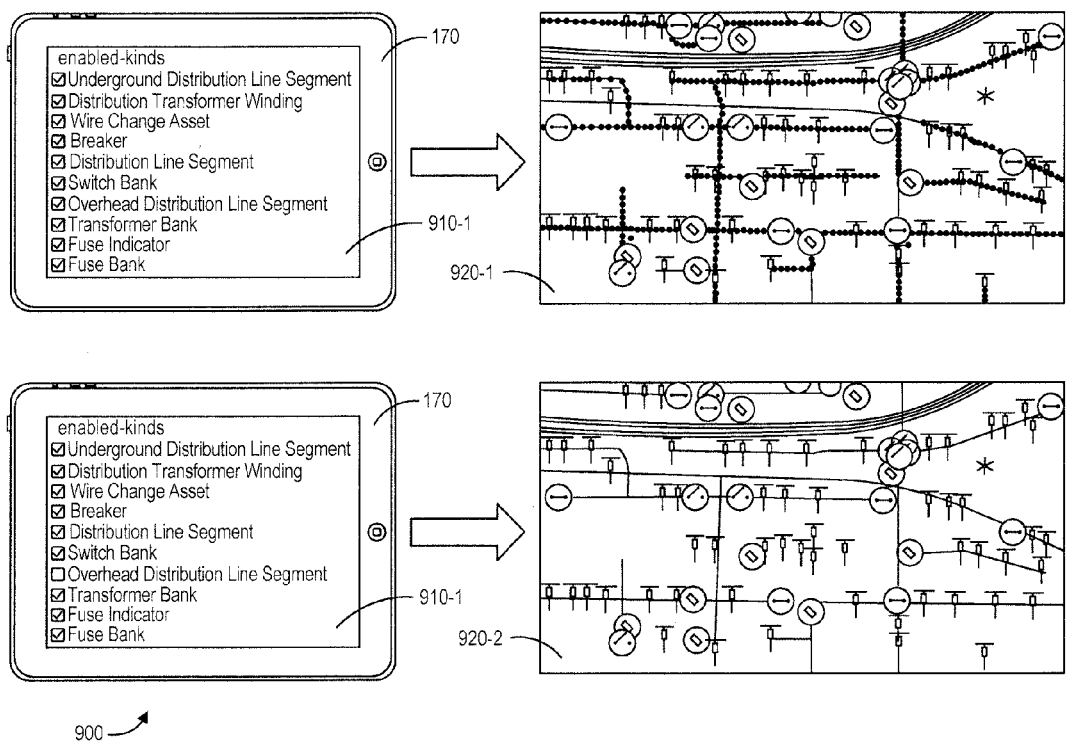
FIG. 9 is a diagram illustrating control of display elements displayed in a visualization using an input device.

FIG. 9 is a diagram 900 showing, on one hand, views 910-1, 910-2 of an input device 170 (in this case a tablet computer) and the corresponding visualizations 920-1, 920-2 to be displayed on a display device 140 (not shown). As shown in the first view 910-1 a graphical user interface is displayed with various display elements relating to a network data visualization shown in visualization 920-1. A user can select/de-select display elements within the graphical user interface to change what is being displayed in the corresponding visualization 920-1. In this example, a user (in the second view 910-2) has de-selected the overhead distribution line segment checkbox in the graphical user interface causing the second visualization 920-2 to be displayed that does not include the overhead distribution lines.

The state of the system including the viewpoint being displayed with respect to the substrate 150 and data lenses 160 as well as the position and configuration of any data lenses 160 can, in some variations, be bundled up in a compact form and saved off. This bundle can be restored at a later time, at which point the viewpoint and the arrangement of the data lenses 160 can return to the previous state. In addition, a bundle can be sent to another person or system to be similarly displayed. Such an arrangement is advantageous in that it allows for optimization of collaboration across time and space. This optimization is enabled as the visualizations can relate to both real-time and historical data and input devices 170 can be utilized across multiple locations. For example, the collaborations can be among display computers 140 and input devices 170 at the same time at the same place, at the same time at different locations, at different times at the same place, and at different times at different places.

Figure 10:
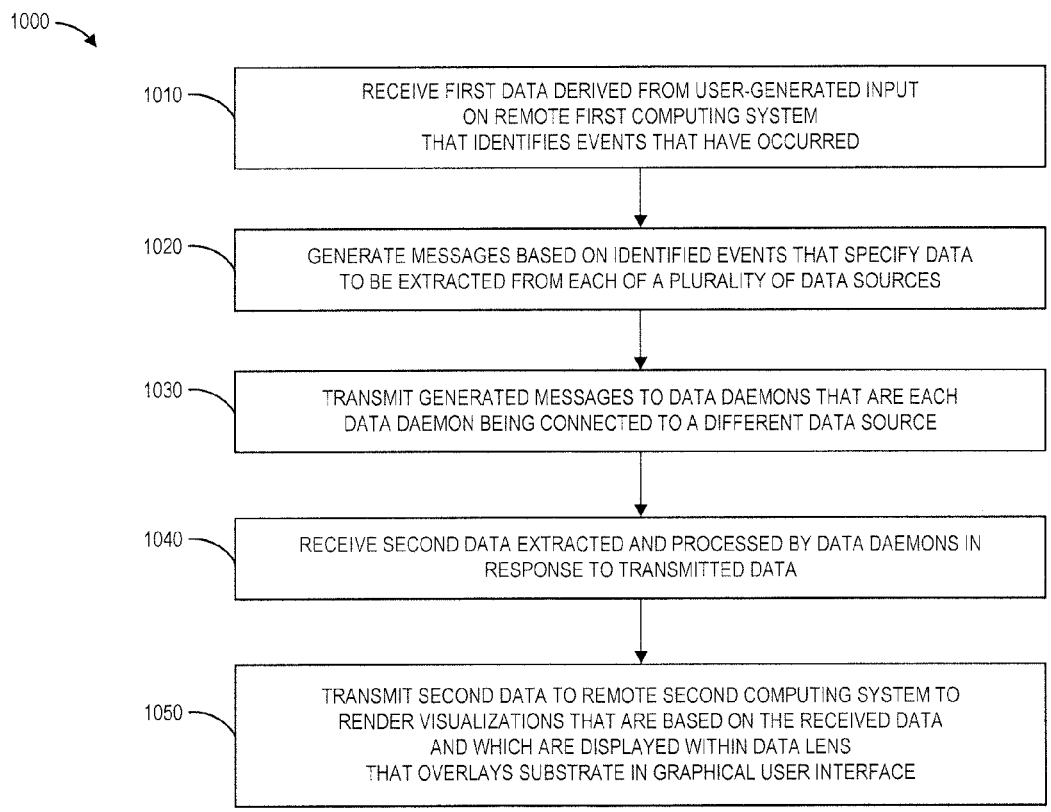
FIG. 10 is a process flow diagram illustrating a technique for interactive visualization of multiple data sources across multiple computers.

FIG. 10 is a process flow diagram 1000 in which, at 1010, a data pool receives data derived from user-generated input on at least one remote first computing system that identifies events that have occurred at the corresponding remote first computing system. Thereafter, at 1020, the data pool generates messages based on the identified events that specify data to be extracted from each of a plurality of data sources. Next, at 1030, the data pool transmits data comprising the generated messages to at least one of a plurality of data daemons with each data daemon being connected to a different data source among a plurality of data sources. Subsequently, at 1040, the data pool receives second data extracted and processed by the data daemons in response to the transmitted data. The data pool next, at 1050, transmits at least a portion of the received second data to at least one remote second computing system to enable the remote second computing system to render, in a graphical user interface, visualizations that are based on the received data and which are displayed within at least one data lens that overlays a substrate in the graphical user interface.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:
    receiving, by a data pool, first data derived from user-generated input on at least one remote first computing system, wherein the received first data is used to identify events that have occurred at a corresponding remote first computing system of the at least one remote first computing systems;
    generating, by the data pool, messages based on the identified events that specify data to be extracted from each of a plurality of data sources;
    transmitting, by the data pool, data comprising the generated messages to at least one of a plurality of data daemons, each data daemon of the plurality of data daemons being connected to a different data source among the plurality of data sources;
    receiving, by the data pool and in response to the transmitted data, second data extracted from data sources specified in the generated messages and processed by corresponding data daemons, the second data comprising visualizations and tags identifying at least one data lens for displaying the visualizations; and
    transmitting, by the data pool, at least a portion of the received second data to at least one remote second computing system to enable the at least one remote second computing system to render, in a graphical user interface, the visualizations that are based on the received second data and which are displayed within the at least one data lens that overlays a substrate in the graphical user interface.

2. The method as in claim 1, wherein the first data is generated by at least one coordination pool in communication with at least one input device.

3. The method as in claim 2, wherein the at least one input device is used to control at least one of: instantiation, deletion, relative position, or size of one or more data lenses.

4. The method as in claim 2, wherein the at least one input device is used to control at least one of: instantiation, deletion, relative position, or size of the substrate.

5. The method as in claim 2, wherein the at least one input device is used to specify display elements to be included within one more data lenses.

6. The method as in claim 1, wherein the at least one data lens is partially transparent so that features on the substrate can be viewed.

7. The method as in claim 1, wherein there are two or more data lens that each partially overlap with another data lens.

8. The method as in claim 1, wherein there are two or more remote computing systems that provide a unified and non-duplicative visualization.

9. The method as in claim 1, further comprising:
    causing at least one code to be displayed on or adjacent to the substrate, the code being used by the at least one remote first computing systems to connect with the at least one second computing system via the data pool.

10. The method as in claim 1, wherein the at least one remote first computing system is the same as the at least one remote second computing system.

11. The method as in claim 1, wherein the at least one remote first computing system at least partially differs from the at least one remote second computing system.

12. A system comprising:
    at least one data processor forming part of at least one computing system; and
    memory storing instructions which, when executed by the at least one data processor, result in operations comprising:
    receiving, by a data pool, first data derived from user-generated input on at least one remote first computing system, wherein the received first data is used to identify events that have occurred at a corresponding remote first computing system of the at least one remote first computing system;
    generating, by the data pool, messages based on the identified events that specify data to be extracted from each of a plurality of data sources;
    transmitting, by the data pool, data comprising the generated messages to at least one of a plurality of data daemons, each data daemon of the plurality of data daemons being connected to a different data source among the plurality of data sources;
    receiving, by the data pool and in response to the transmitted data, second data extracted from data sources specified in the generated messages and processed by corresponding data daemons, the second data comprising visualizations and tags identifying at least one data lens for displaying the visualizations; and
    transmitting, by the data pool, at least a portion of the received second data to at least one remote second computing system to enable the at least one remote second computing system to render, in a graphical user interface, the visualizations that are based on the received second data and which are displayed within the at least one data lens that overlays a substrate in the graphical user interface.

13. The system as in claim 12, wherein the first data is generated by at least one coordination pool in communication with at least one input device.

14. The system as in claim 13, wherein the at least one input device is used to control at least one of: instantiation, deletion, relative position, or size of one or more data lenses; and wherein the at least one input device is used to control at least one of: instantiation, deletion, relative position, or size of the substrate.

15. The system as in claim 13, wherein the at least one input device is used to specify display elements to be included within one more data lenses.

16. The system as in claim 12, wherein:
the at least one data lens is partially transparent so that features on the substrate can be viewed; there are two or more data lens that each partially overlap with another data lens;
there are two or more remote computing systems that provide a unified and non-duplicative visualization;
a code is displayed on or adjacent to the substrate, the code being used by the at least one remote first computing system to connect with the at least one second computing system via the data pool.

17. A non-transitory computer program product storing instructions which, when executed by at least one data processor forming part of at least one computing system, result in operations comprising:
at least one data processor forming part of at least one computing system; and
memory storing instructions which, when executed by the at least one data processor, result in operations comprising:
receiving, by a data pool, first data derived from user-generated input on at least one remote first computing system, wherein the received first data is used to identify events that have occurred at a corresponding remote first computing system of the at least one remote first computing system;
generating, by the data pool, messages based on the identified events that specify data to be extracted from each of a plurality of data sources;
transmitting, by the data pool, data comprising the generated messages to at least one of a plurality of data daemons, each data daemon of the plurality of data daemons being connected to a different data source among the plurality of data sources;
receiving, by the data pool and in response to the transmitted data, second data extracted from data sources specified in the generated messages and processed by corresponding data daemons, the second data comprising visualizations and tags identifying at least one data lens for displaying the visualizations; and
transmitting, by the data pool, at least a portion of the received second data to at least one remote second computing system to enable the at least one remote second computing system to render, in a graphical user interface, the visualizations that are based on the received second data and which are displayed within the at least one data lens that overlays a substrate in the graphical user interface.

18. The computer program product as in claim 17, wherein the first data is generated by at least one coordination pool in communication with at least one input device, wherein the at least one input device is used to control at least one of: instantiation, deletion, relative position, or size of one or more data lenses; and wherein the at least one input device is used to control at least one of: instantiation, deletion, relative position, or size of the substrate.

19. The computer program product as in claim 17, wherein the at least one input device is used to specify display elements to be included within one more data lenses.

20. The computer program product as in claim 17, wherein:
the at least one data lens is partially transparent so that features on the substrate can be viewed;
there are two or more data lens that each partially overlap with another data lens;
there are two or more remote computing systems that provide a unified and non-duplicative visualization;
a code is displayed on or adjacent to the substrate, the code being used by the at least one remote first computing system to connect with the at least one second computing system via the data pool.

* * * * *